Nov. 10, 1970   E. E. SANDERS ETAL   3,539,416
APPARATUS FOR FORMING A HOLLOW PLASTIC ARTICLE
Filed March 27, 1967   4 Sheets-Sheet 1

INVENTORS
ELLSWORTH E. SANDERS
KENNETH H. WOODRICH
BY
Whittemore, Hulbert & Belknap
ATTORNEYS

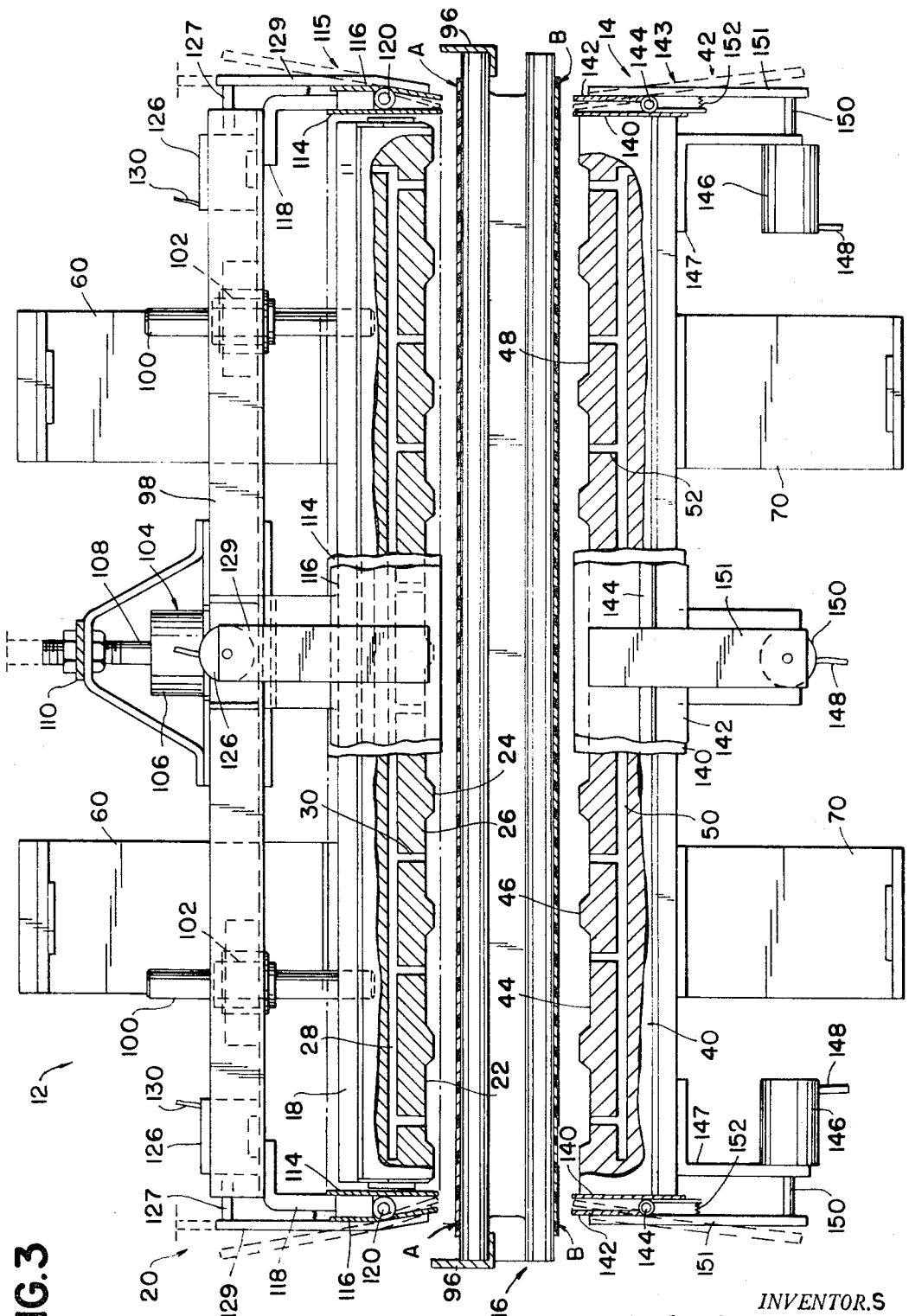

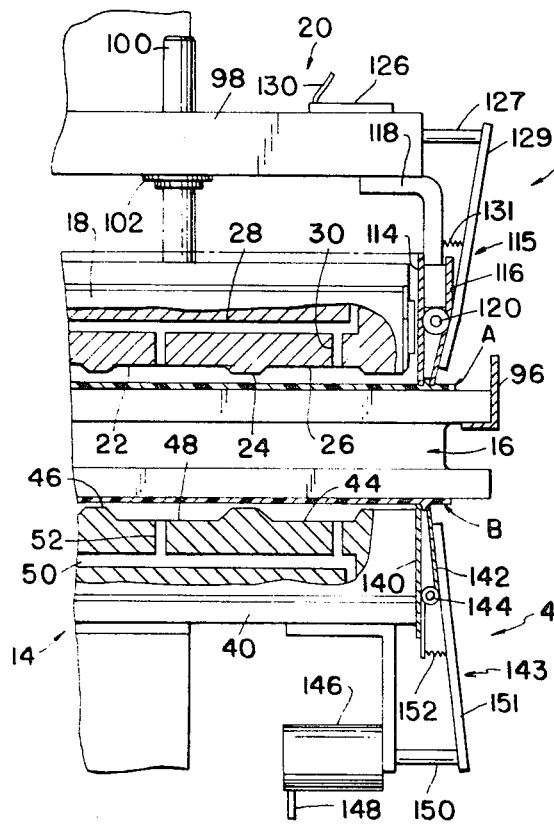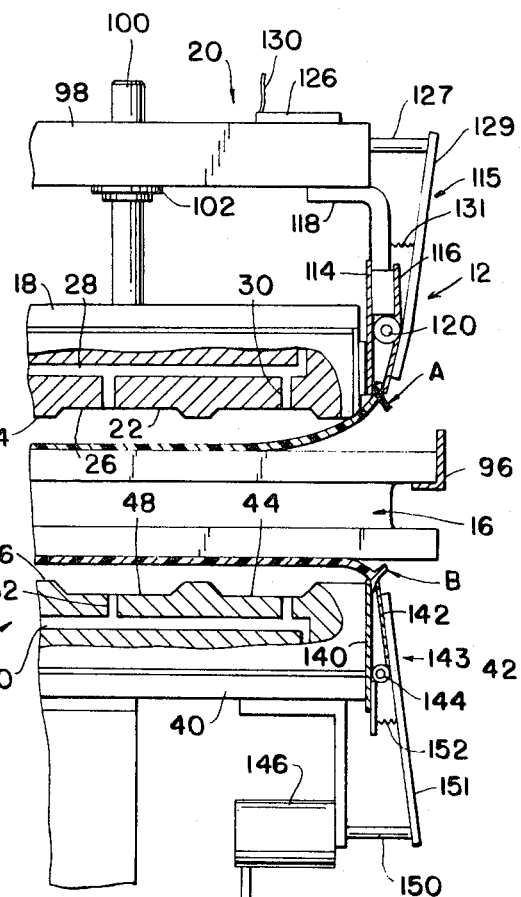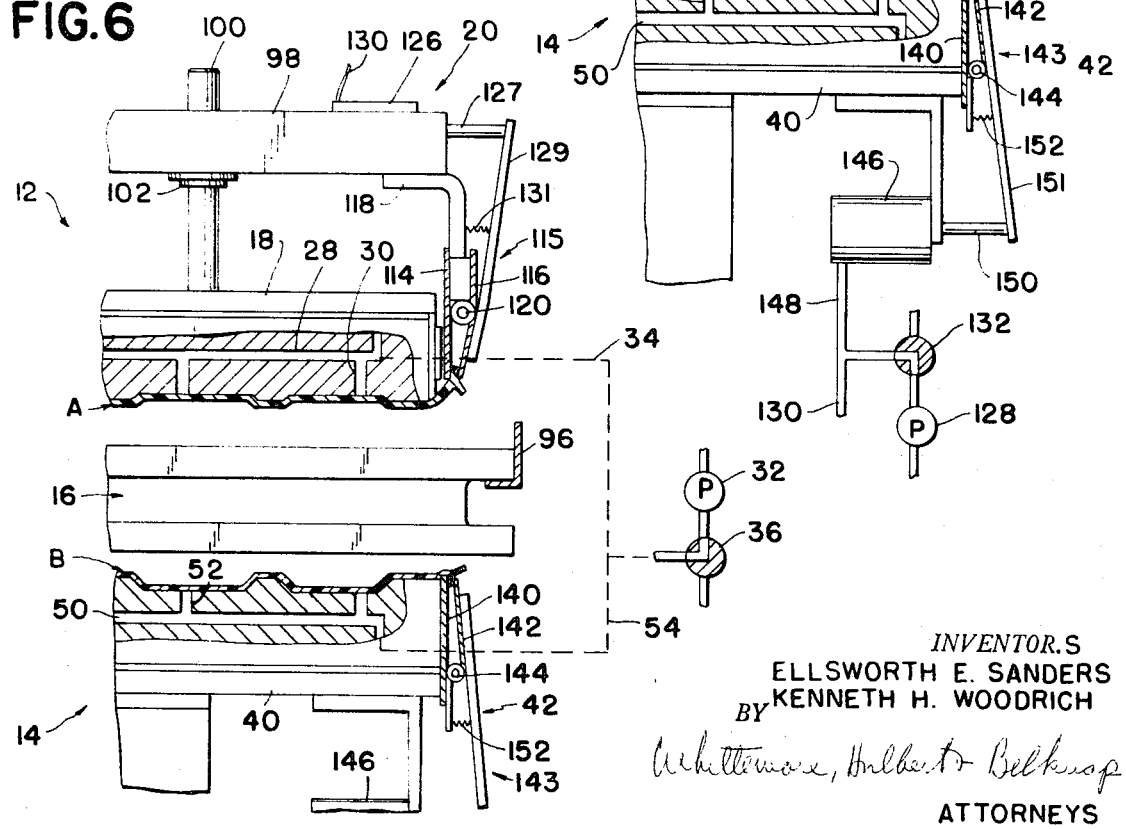

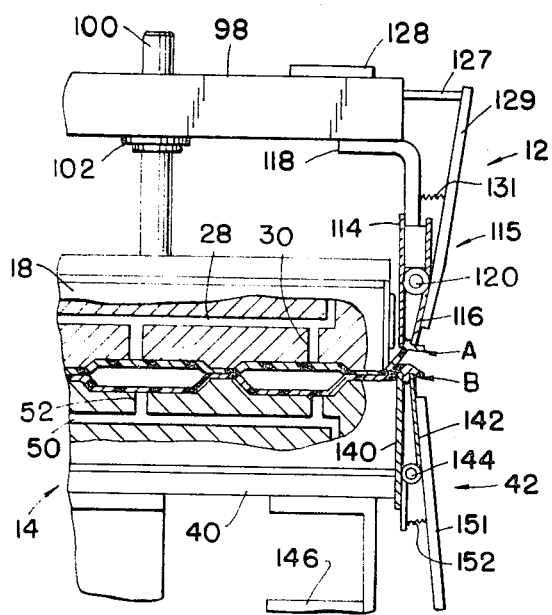
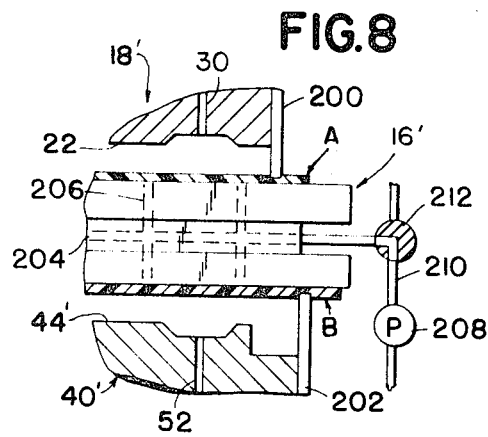
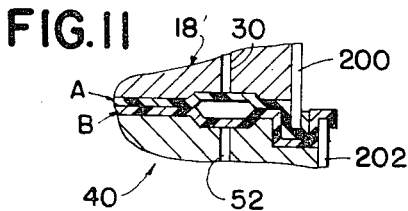
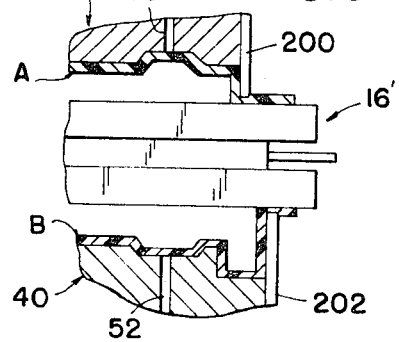
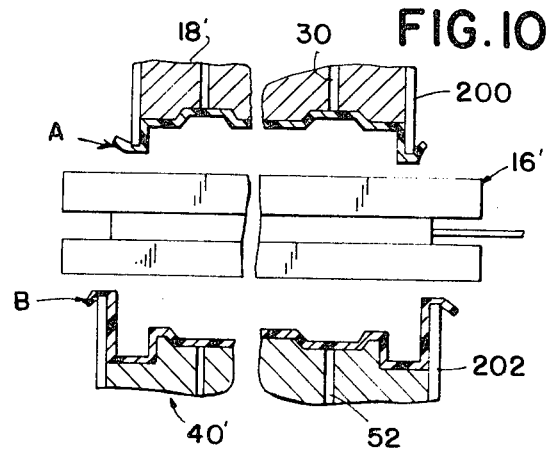
INVENTORS
ELLSWORTH E. SANDERS
KENNETH H. WOODRICH
BY
ATTORNEYS United States Patent Office 3,539,416
Patented Nov. 10, 1970

3,539,416
APPARATUS FOR FORMING A HOLLOW
PLASTIC ARTICLE
Ellsworth E. Sanders, Birmingham, and Kenneth H. Woodrich, Utica, Mich., assignors to Polyform, Inc., Pontiac, Mich., a corporation of Michigan
Filed Mar. 27, 1967, Ser. No. 625,999
Int. Cl. B32b 31/20
U.S. Cl. 156—499        10 Claims

ABSTRACT OF THE DISCLOSURE

The molding machine has a pair of dies movable toward and away from each other. A heating platen moves from a loading position spaced laterally from the dies to a position between the dies. Plastic sheets are supported on opposite sides of the platen and are heated by the platen to their heat fusible temperature.

When the platen is between the dies, the dies move toward the platen and the heated sheets are transferred to the dies. The platen is withdrawn and the dies moved relatively toward one another to bring the heated sheets into heat fusible contact to form a hollow double-walled article.

In one embodiment, clamps grip the edges of the sheets on the platen and pull the edges away, and then vacuum applied over the die faces draws the sheets into intimate contact with the die faces. In another embodiment, the dies contact the sheets in a substantially full peripheral seal around the die faces, and differential pressure is established by vacuum over the die faces and by positive pressure over the sides of the platen to draw the sheets into intimate contact with the die faces.

BACKGROUND OF THE INVENTION

The invention relates to the art of forming a hollow double-walled plastic article by drawing two heated sheets into intimate contact with the faces of two dies, and then relatively moving the dies together to bring the sheets into heat fusible contact and fusing the sheets together.

SUMMARY OF THE INVENTION

It is an essential object of the invention to provide an improved method and apparatus for making a hollow double-walled plastic article by fusing two sheets together.

Another object of the invention is to provide an improved molding machine including a pair of relatively movable dies, and a platen which both supports the plastic sheets between the dies and heats them to their heat fusible temperature.

Another object is to provide dies having vacuum passages for drawing the plastic sheets into intimate contact with the die faces.

Another object is to provide positive pressure passages in the heating platen to assist in the transfer of the plastic sheets from the platen to the dies.

Another object is to provide the dies with means for gripping the edges of the plastic sheets to pull the edges away from the platen.

Other objects and features of the invention will become apparent as the description proceeds, especially when taken in conjunction with the accompanying drawings, wherein:

FIG. 3 is an enlarged fragmentary elevation, with parts broken away and in section, of portions of FIG. 1 including the dies, heating platen and associated structure.

FIG. 4 is a fragmentary elevation, with parts in section, showing the dies in a different position.

FIGS. 5 and 6 are similar to FIG. 4, but show the parts in still other positions.

FIG. 7 is similar to FIGS. 4–6, but shows the dies after they have been brought together.

FIG. 8 is a fragmentary sectional view of a modification.

FIGS. 9–11 are similar to FIG. 8 but show the parts in different positions.

Figure 1:
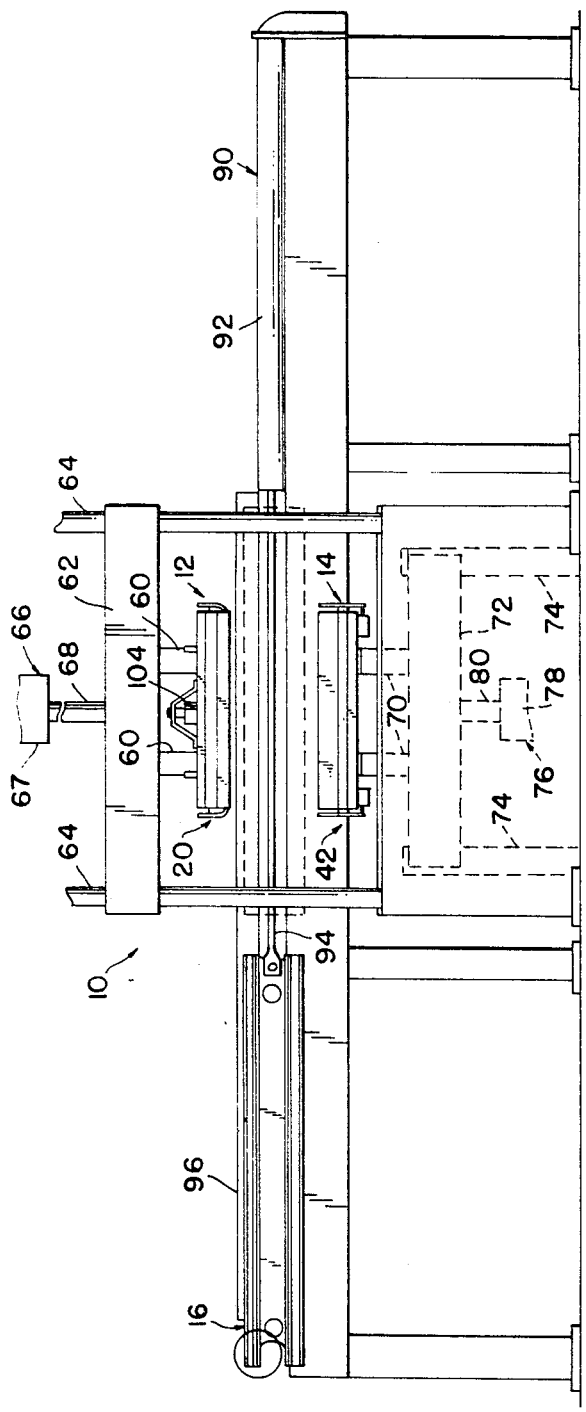
FIG. 1 is a front elevational view of apparatus constructed in accordance with our invention.

Referring now more particularly to the drawings, and especially to FIGS. 1–7 thereof, the molding machine is generally designated 10 and includes upper and lower die assemblies 12 and 14 and a heating platen 16. The molding machine is adapted to mold hollow double-walled plastic articles such, for example, as trim panels for automobiles, and plastic containers.

Referring particularly to FIG. 3, the upper die assembly 12 includes a die 18 and a clamping assembly 20. The die 18 in the present instance is of rectangular form and has a die face 22. The die face is of irregular contour having raised portions 24 which lie flush with one another in a common horizontal plane and the relieved portions 26. The die 18 is provided with internal vacuum passages 28 having branches 30 opening through the mold face 22. A vacuum pump 32 communicates with the vacuum passages through a line 34 controlled by a valve 36. The valve 36 is capable of opening the passages to atmosphere or connecting the vacuum passages to the vacuum pump as desired.

The lower die assembly 14 includes a die 40 and a clamping assembly 42. The die 40 in the present instance is of rectangular form and has a die face 44 formed with raised portions 46 and relieved portions 48. The raised portions 46 lie flush with one another in a common horizontal plane. The die 40 has internal vacuum passages 50 provided with branch passages 52 opening through the die face. A conduit 54 leads from the line 34 to the vacuum passages in the lower die so that vacuum or atmospheric pressure is applied to these passages simultaneously with the introduction of vacuum or atmosphere to the vacuum passages in the upper die 18.

The upper and lower die assemblies are capable of vertical movement toward and away from one another. As seen, rigid beams 60 are secured to and extend vertically upward from the upper die, being secured at their upper ends to an upper press platen 62 which is guided for vertical movement on the vertical posts 64. A reversible hydraulic piston cylinder assembly 66 is provided for raising and lowering the platen 62 and upper die assembly 12. Assembly 66 includes a fixed vertical cylinder 67, a piston not shown reciprocable within the cylinder, and a piston rod 68 extending from the lower end of the cylinder and connected centrally to the platen 62.

The lower die assembly 14 has secured to the die 40 the depending rigid beam members 70 which are connected at their lower ends to the lower press platen 72, the latter being guided for vertical reciprocation by the corner guides 74. A reversible hydraulic piston cylinder assembly 76 is provided having a cylinder 78 secured in fixed position beneath the lower press platen 72. A piston not shown within cylinder 78 has a rod 80 extending from the upper end of the cylinder and connected to the press platen.

It will be obvious that by suitable hydraulic controls operating the piston cylinder assemblies 66 and 76, the die assemblies may be raised or lowered as required. It will also be understood that such control and operation of cylinders 66 and 76 may be either manual or automatic.

The heating platen 16 is in the form of a flat rectangular or square member having substantially the same shape as, although of somewhat larger dimension than, the dies 18 and 40. The heating platen 16 has a flat horizontal upper surface and a flat horizontal lower surface which are adapted to support the plastic sheets A and B thereon. These plastic sheets may be of any suitable thermoplastic material, such, for example, as high density polyethylene. The sheets A and B when loaded on the upper and lower surfaces of the heating platen adhere thereto due to the heated condition of the upper and lower surfaces, no other holding means for the sheets being required.

Figure 2:
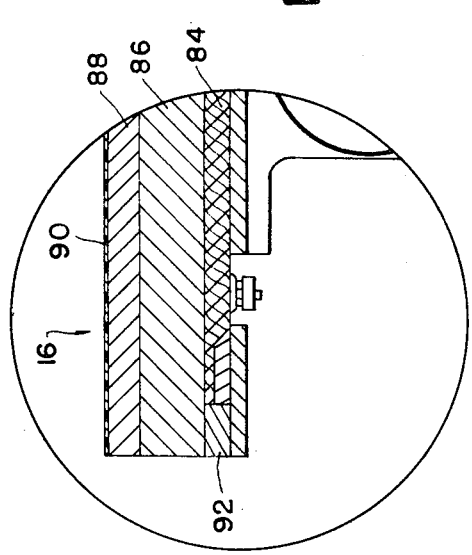
FIG. 2 is an enlarged fragmentary sectional view of a portion of FIG. 1.

FIG. 2 shows in cross-section the construction of the upper portion of the heating platen 16. As there shown, the upper portion of the heating platen has a heating element 84 forming an inner layer, a slab of metal 86 forming an intermediate layer, and a metal surface plate 88 coated with Teflon 90. A marginal spacer 92 is provided to confine the edge of the heating element 84.

The lower portion of the heating platen is of identical construction to the upper portion, that is it has an inner layer consisting of a heating element, an intermediate heated metal slab and an outer metal Teflon coated plate. Likewise, there is a marginal spacer surrounding and enclosing the heating element. The heating elements of both the upper and lower portions of the heating platen are heated by any suitable electrical means and provide a more or less uniform distribution of heat to the outer Teflon coated plate upon which the plastic sheets are supported. The heat of these upper and lower Teflon coated surfaces of the heating platen 16 causes the plastic sheets to become heated to their heat fusible temperatures. The plastic sheets are adhered and retained upon the heating platen 16 solely by the heat of the platen.

The heating platen 16 is horizontally movable from a loading position shown in solid lines in FIG. 1 to a position between the dies shown in dotted lines. The heating platen 16 is moved from one position to the other by a pair of parallel, reversible pneumatic piston cylinder assemblies 90 having cylinders 92 fixed in horizontal position with reciprocal pistons (not shown) therein. Piston rods 94 extend from the cylinders and are connected to opposite sides of the heating platen. The cylinders are operated simultaneously to move the heating platen, and during such movement the heating platen is supported and guided upon the spaced, horizontal parallel guide rails 96. The rods 94 are spaced far enough apart to clear the die assemblies so that when the die assemblies come together in the molding operation, as described more fully hereinafter, the rods 94 will not interfere.

The clamping assembly 20 of the upper die assembly 12 will now be described. Referring to FIG. 3, is will be noted that a horizontal frame 98 is mounted above the upper die 18 in horizontal, parallel relation therewith. The frame 98 is capable of vertical movement relative to the die 18, and for this purpose the guide pins 100 are provided. Guide pins 100 are secured at their lower ends to the die 18 and extend upwardly therefrom through guide bushings 102 in the frame 98. Pins 100 guide the vertical movement of frame 98 relative to die 18. In order to effect such movement of the frame 98, a double-acting, pneumatic piston cylinder assembly 104 is provided which includes a vertical cylinder 106 secured at its lower end to die 18 centrally of the latter. A piston (not shown) within the cylinder has a rod 108 extending upwardly through the upper end of the cylinder, being connected to the brackets 110 carried by frame 98. It will be obvious that pressure fluid admitted to the lower end of cylinder 106 while relieving the upper end will raise the frame 98 of the clamping assembly 20 to an upper limit relative to die 18. Relieving the pressure in the lower end of cylinder 106 while admitting pressure to the upper end will lower the frame 98 to a lower limit relative to die 18.

The clamping assembly 20 also includes four clamping devices 115, one on each of the four sides of the rectangular die 18. The clamping devices are of the same construction, except that the side clamping devices are somewhat longer than the end clamping devices. Referring further to FIG. 3, each of the four clamping devices associated with the upper die includes an inner fixed jaw 114 and an outer pivotal jaw 116. The inner jaw 114 extends vertically and is secured to a bracket 118 depending from the frame 98. The fixed jaw 114 is in the form of an elongated plate which extends along one side or end of the die 18 for the full horizontal extent thereof. Actually the four inner jaws of the four clamping devices are connected to one another at the corners of the die 18 so that the inner jaws 114 form in effect a rectangular closed frame.

The outer pivotal jaws 116 are likewise in the form of elongated plates and are substantially coextensive in horizontal extent with the fixed jaws 114. Such pivotal jaws 116 are hinged to the fixed jaws on horizontal pivots 120 and are capable of swinging from the solid line open position shown in FIG. 3 to the dotted line position in which their lower edges swing toward the lower edges of the fixed jaws to close or grip upon material between the jaws. While the pivotal jaws are substantially coextensive with the fixed jaws and thus extend substantially to the corners of the die 18, obviously the ends of these jaws cannot be connected together because of their pivotal movement. Air piston cylinder assemblies 126 mounted on frame 98 are provided for opening and closing the jaws. A pump 128 supplies air under pressure to the piston cylinder assemblies 126 through lines 130. A valve 132 is provided to connect lines 130 either to the pressure of pump 128 or to the atmosphere. A piston (not shown) within the cylinder of each assembly has a rod 127 engageable with an arm 129 secured to the associated pivotal jaw 116 so that when air under pressure is admitted to the assembly the rod 127 is extended to rock arm 129 and close the pivotal jaw. Springs 131 open the pivotal jaws when the air pressure in cylinder assemblies 126 is relieved.

The lower edges of the jaws 114 and 116 of the clamping devices 115, extend below the raised portions 24 of die face 22 in the lower limit of the clamping assembly 20, and extend above the raised portions 24 in the upper limit of the clamping assembly.

The clamping assembly 42 of the lower die assembly 14 will now be described. Referring to FIG. 3, the clamping assembly 42 includes four clamping devices 143, one on each of the four sides of the rectangular die 40. The clamping devices are of the same construction, except that the side clamping devices are somewhat longer than the end clamping devices. Referring further to FIG. 3, each of the four clamping devices associated with the lower die includes an inner fixed jaw 140 and an outer pivotal jaw 142. The inner jaws 140 extend vertically and are secured in surface-to-surface relation to the sides and ends of the die in positions such that their upper edges project above the plane of the raised portions 46 of the die face 44. The fixed jaws 140 are in the form of elongated plates which extend along the sides and ends of the die 40 for the full horizontal extent thereof. Actually the four inner jaws of the four clamping devices are connected to one another at the corners of the die 40 so that the inner jaws 140 form in effect a rectangular closed frame.

The outer pivotal jaws 142 are likewise in the form of elongated plates and are substantially coextensive in horizontal extent with the fixed jaws 140. Such pivotal jaws 142 are hinged to the fixed jaws on horizontal pivots 144 and are capable of swinging from the solid line open position shown in FIG. 3 to the dotted line position in which their upper edges swing toward the upper edges of the fixed inner jaws to close or grip upon material between the jaws. While the pivotal jaws are substantially coextensive with the fixed jaws and thus extend substantially to the corners of the die 40, obviously the ends of these jaws cannot be connected together because of their pivotal movement. Air cylinder assemblies 146 mounted on dies 40 by brackets 147 are provided for opening and closing the jaws. Air under pressure is supplied to the assemblies 146 by pump 128 through lines 148. The valve 132 controls the air pressure to the cylinders 126 associated with the upper clamping devices and also to cylinders 146 associated with the lower clamping devices so that the upper and lower clamping devices open and close in unison. The assemblies 146 are like the assemblies 126 in that they have a piston (not shown) within the cylinder of each assembly provided with a rod 150 engageable with an arm 151 secured to the associated pivoted jaw 142 so that when air under pressure is admitted to the assembly 146 the rod 150 is extended to rock arm 151 an close the pivotal jaw. Springs 152 open the pivotal jaws when the air pressure in the assemblies 146 is relieved.

In the operation of the machine, the die assemblies 12 and 14 are initially in the position shown in FIG. 3, that is the lower die assembly is lowered to its lower limit, the upper die assembly is raised to its upper limit and the clamping assembly 20 of the upper die assembly is lowered relative to the upper die to its lower limit. At this time, the heating platen assumes the solid line position in FIG. 1 for loading of plastic sheets A and B on its upper and lower heated Teflon coated surfaces. The heat of these Teflon coated surfaces is such that within a matter of a few seconds, the plastic sheets are heated to their fusible temperatures. The heat of the platen is sufficient to cause the sheets to adhere thereto without any other means being required for the purpose.

Soon after loading the plastic sheets A and B upon the upper and lower surfaces of the heating platen, the heating platen is moved by cylinder assemblies 90 to the dotted line position in FIG. 1 between the open die assemblies. During such movement of the heating platen, the plastic sheets A and B are rapidly being heated to their heat fusible temperatures.

Following the arrival of the heating platen to its position between the die assemblies, and the few seconds of time having elapsed for the plastic sheets A and B to reach their heat fusible temperatures, the upper and lower cylinder assemblies 66 and 76 are simultaneously operated to raise the lower die assembly to the FIG. 4 position and to lower the upper die assembly to the FIG. 4 position. In this position of the lower die assembly, the fixed inner jaws 140 of the lower clamping devices 143 contact the plastic sheet B on the heating platen along a continuous closed square line defined by the upper edges of the fixed jaws 140 so as to provide a closed space defined by the die face 44 and the plastic sheet itself. The jaws of the lower clamping devices 143 at this time are open. In this position of the upper die assembly, the inner jaws 114 of the upper clamping devices 115 contact the plastic sheet A in a continuous square line, but a closed space is not thereby provided because the inner jaws 114 are not connected directly to the end and sides of the upper die. At this time, the pivotal jaws of the upper clamping devices 115 are still open.

Then the valve 132 is operated to send air under pressure to the assemblies 126 and 146 and simultaneously close all of the clamping devices 115 and 143 of the upper and lower clamping assemblies. Accordingly, the clamping devices of the upper and lower assemblies close upon and grip the plastic material between the jaws. This condition of the apparatus is shown in FIG. 4.

Thereafter, the cylinder 104 is operated to elevate the clamping assembly 20 relative to die 18 to its upper limit (FIG. 5) in which the jaws of the clamping devices 115 are raised above the level of the raised portions 24 of the die face 18. In so doing, the clamping devices 115 pull the edges of the plastic material of sheet A away from the heating platen and draw such edges up tight against the periphery or margin of the die face 22 of the upper die 18. The seal between the plastic sheet and the side and end edges of the upper die 18 is a continuous marginal or peripheral seal around the edge of the die face 22 so as to provide a closed space between the plastic sheet and the die face 22.

Thereafter, the lower die assembly 14 is lowered to its lower limit as shown in FIG. 5, and the upper die assembly 12 is raised to its upper limit, also as shown in FIG. 5, to clear the heating platen for its subsequent removal. Either shortly after retraction of the two die assemblies or simultaneously therewith, the valve 36 is operated to subject the vacuum passages in dies 18 and 40 to vacuum so as to suck or draw the plastic sheets A and B up into intimate contact with the die faces 22 and 44.

The reason for first gripping the margins of the plastic and drawing such margins away from the platen is to allow atmospheric pressure to get behind the plastic sheets before vacuum is applied. FIG. 6 illustrates the condition of the apparatus after the die assemblies have been retracted and the plastic sheets have been drawn by vacuum into intimate contact with the die faces.

Thereafter, the heating platen 16 is withdrawn to its loading position where two more plastic sheets are loaded onto its top and bottom surfaces for heating and subsequent molding in a later cycle. Following withdrawal of the heating platen from the space between the die assemblies, the cylinder 66 is operated to lower the upper die assembly causing the upper die 18 to close upon the lower die 40 in the manner shown in FIG. 7. The upper clamping assembly 20 remains up to clear the lower clamping assembly 42. In this position of the dies, portions of the plastic sheets A and B are brought into heat fusible contact with one another to cause the sheets to fuse together where they contact, and the dies remain closed long enough to cool the plastic sheets so the resultant part is manageable. After the dies close, the clamps are opened to release their grip on the plastic. After a short interval of time sufficient to permit the sheets to fuse together, the cylinder 66 is operaed to raise the die assembly 12 to its FIG. 3 position in preparation for the next cycle, and the hollow plastic double-walled article formed by the fusion of the two sheets A and B together is removed. Before the next cycle, the clamping assembly 20 is lowered to its lower limit shown in FIG. 3.

FIGS. 8–11 illustrate a modification of the invention in which the clamping assemblies 20 and 42 are omitted. The dies are of substantially the same construction and therefore are indicated by the same characters of reference primed. The upper die 18' differs from the upper die 18 in that it has a marginal depending sealing flange 200 which is in the form of a closed rectangle extending along the sides and ends of the die and projects below the die face 22'. The lower die 40' differs from the lower die 40 in that it is provided with a marginal upwardly extending sealing flange 202 which is in the form of a closed rectangle extending along the sides and ends of the lower die 40' and projects above the die face 44'. It will be noted that the sealing flange 200 of the upper die is smaller than the sealing flange 202 of the lower die to avoid interference between the sealing flanges when the dies are brought together. As shown in FIG. 11, the upper sealing flange 200 nests within the lower sealing flange 202 in the closed position of the dies.

The heating platen in the form of the invention illustrated in FIGS. 8–11 is substantially the same as the heating platen 16 and accordingly is designated by the same character of reference primed. The heating platen 16' differs from heating platen 16 in that it has internal air pressure passages 204 and branch passages 206 opening through its top and bottom surfaces. An air pump 208 supplies air under pressure to the passages in platen 16' through line 210. A valve 212 is provided in the line to permit the passages to be placed in communication selectively with the pump 208 and atmosphere.

In the operation of the modified construction and following loading of the plastic sheets A and B on the heating platen and transfer of the same to a position between the dies, the cylinders 66 and 76 are operated to raise the lower die 40' from its lower limit and to lower the upper die 18' from its upper limit, causing sealing flanges 200 and 202 to contact the plastic sheets A and B and thereby provide a closed space between each plastic sheet and the associated die face. FIG. 8 shows the position of the dies after operation of the cylinders.

Thereafter, the valve 36 is operated to apply vacuum to the die passages and simultaneously the valve 212 is operated to apply air under a positive pressure, that is above atmospheric pressure, to the passage in platen 16' to cause the sheets A and B to be drawn by differential pressure into intimate contact with the die faces. This condition of the parts is illustrated in FIG. 9.

Thereafter, the lower die is lowered to its lower limit and the upper die raised to its upper limit (FIG. 10) to permit the withdrawal of the heating platen. As with the first embodiment, following withdrawal of the heating platen, the upper die is lowered by operation of the cylinder assembly 66 into closed relation with the lower die 40', bringing portions of the heated plastic sheets into heat fusible contact (FIG. 11). The dies remain closed long enough for fusion to take place between the contacting portions of the sheets, and then the upper die is raised to its upper limit in preparation for the next cycle of operation and the molded double-wall plastic article is removed.

What we claim as our invention is:

1. Apparatus for forming a hollow plastic article comprising cooperating dies having opposed die faces and movable toward and away from each other, a heating platen having opposite sides respectively adapted to support thermoplastic sheets thereon and to heat such sheets while thus supported to their heat fusible temperature, means for moving said platen between a loading position spaced laterally from said dies and a position between said dies in which the heated sheets supported on said opposite sides of said platen are opposed to said die faces, means for moving said dies toward and away from each other, said die moving means being operable to move said dies toward one another to sheet pick-up positions adjacent to the heated sheets on opposite sides of said platen when the latter is positiond between said dies, means for transferring the heated sheets from said platen to the opposed die faces of said dies following movement of said dies to said sheet pick-up positions, said die moving means being operable to move said dies away from one another to permit the withdrawal of said platen to its loading position, and being operable then to relatively move said dies toward one another to bring the heated sheets into heat fusible contact, said transfer means including gripping means on said dies adapted to contact and grip the heated sheets on said platen when the latter is between said dies and said dies are in their sheet pick-up positions.

2. The apparatus defined in claim 1, wherein said transfer means includes vacuum means having vacuum passages opening through said die faces.

3. Apparatus for forming a hollow plastic article comprising cooperating dies having opposed die faces and movable toward and away from each other, a heating platen having opposite sides respectively adapted to support thermoplastic sheets thereon and to heat such sheets while thus supported to their heat fusible temperature, means for moving said platen between a loading position spaced laterally from said dies and a position between said dies in which the heated sheets supported on said opposite sides of said platen are opposed to said die faces, means for moving said dies toward and away from each other, said die moving means being operable to move said dies toward one another to sheet pick-up position adjacent to the heated sheets on opposite sides of said platen when the latter is positioned between said dies, means for transferring the heated sheets from said platen to the opposed die faces of said dies following movement of said dies to said sheet pick-up positions, said die moving means being operable to move said dies away from one another to permit the withdrawal of said platen to its loading position, and being operable then to relatively move said dies toward one another to bring the heated sheets into heat fusible contact, said transfer means including clamps around the edges of one of said dies, means mounting said clamps for movement relative to said one die in the direction of movement thereof, means for moving said clamps relative to said one die, and means for opening and closing said clamps.

4. The apparatus defined in claim 3, wherein said clamps are movable relative to said one die from an extended position projecting beyond the face of said one die to a withdrawn position relative to the face of said one die, said clamps, when said one die is in sheet pick-up position and said clamps are in extended position, being adapted to be closed and grip a heated sheet on said platen and when withdrawn to pull the margin of the gripped, heated sheet against the edges of the face of said one die in substantially full peripheral sealing contact, and vacuum means operable after such sealing contact is made for drawing the gripped, heated sheet against the face of said one die.

5. Apparatus for forming a hollow plastic article comprising cooperating dies having opposed die faces and movable toward and away from each other, a heating platen having opposite sides respectively adapted to support thermoplastic sheets thereon and to heat such sheets while thus supported to their heat fusible temperature, means for moving said platen between a loading position spaced laterally from said dies and a position between said dies in which the heated sheets supported on said opposite sides of said platen are opposed to said die faces, means for moving said dies toward and away from each other, said die moving means being operable to move said dies toward one another to sheet pick-up positions adjacent to the heated sheets on opposite sides of said platen when the latter is positioned between said dies, means for transferring the heated sheets from said platen to the opposed die faces of said dies following movement of said dies to said sheet pick-up positions, said die moving means operable to move said dies away from one another to permit the withdrawal of said platen to its loading position, and being operable then to relatively move said dies toward one another to bring the heated sheets into heat fusible contact, said transfer means including clamps around the edges of one of said dies, means for opening and closing said clamps, said clamps projecting beyond the face of said one die and, in the sheet pick-up position of said one die, being adapted to contact a heated sheet on said platen in substantially full peripheral sealing contact forming a substantially closed space with the face of said one die, and vacuum means operable after such sealing contact is made for drawing the gripped, heated sheet against the face of said one die.

6. Apparatus for forming a hollow plastic article comprising cooperating dies having opposed die faces and movable toward and away from each other, a heating platen having opposite sides respectively adapted to support thermoplastic sheets thereon and to heat such sheets while thus supported to their heat fusible temperature, means for moving said platen between a loading position spaced laterally from said dies and a position between said dies in which the heated sheets supported on said opposite sides of said platen are opposed to said die faces, means for moving said dies toward and away from each other, said die moving means being operable to move said dies toward one another to sheet pick-up positions adjacent to the heated sheets on opposite sides of said platen when the latter is positioned between said dies, means for transferring the heated sheets from said platen to the opposed die faces of said dies following movement of said dies to said sheet pick-up positions, said die moving means being operable to move said dies away from one another to permit the withdrawal of said platen to its loading position, and being operable then to relatively move said dies toward one another to bring the heated sheets into heat fusible contact, said transfer means including annular means on one of said dies extending around the margin of the face of said die and projecting beyond said face, said annular means being adapted, in the sheet pick-up position of said one die, to contact a sheet on said platen in substantially full peripheral sealing contact, and differential pressure means operable after such sealing contact is made for moving the sheet against the face of said one die.

7. The apparatus defined in claim 6, wherein said differential pressure means includes vacuum means having vacuum passages opening through the face of said one die.

8. The apparatus defined in claim 6, wherein said differential pressure means includes positive pressure means having passages opening through a side of said platen.

9. The apparatus defined in claim 6, wherein said transfer means includes annular means on the other of said dies extending around the margin of the face of said other die and being adapted, in the sheet pick-up position of said other die, to contact a sheet on said platen in substantially full peripheral sealing contact, and differential pressure means operable after such sealing contact is made for moving the sheet against the face of said other die.

10. Apparatus for forming a hollow plastic article comprising cooperating dies having opposed die faces and movable toward and away from each other, a heating platen having opposite sides respectively adapted to support thermoplastic sheets thereon and to heat such sheets while thus supported to their heat fusible temperature, means for moving said platen between a loading position spaced laterally from said dies and a position between said dies in which the heated sheets supported on said opposite sides of said platen are opposed to said die faces, means for moving said dies toward and away from each other, said die moving means being operable to move said dies toward one another to sheet pick-up positions adjacent to the heated sheets on opposite sides of said platen when the latter is positioned between said dies, means for transferring the heated sheets from said platen to the opposed die faces of said dies following movement of said dies to said sheet pick-up positions, said die moving means being operable to move said dies away from one another to permit the withdrawal of said platen to its loading position, and being operable then to relatively move said dies toward one another to bring the heated sheets into heat fusible contact, said transfer means including gripping means associated with one of said dies adapted to grip the adjacent heated sheet on said platen when the latter is between said dies and said one die is in its sheet pickup position.

References Cited

UNITED STATES PATENTS

| | | |
|---|---|---|
| 1,358,289 | 11/1920 | Cigol. |
| 1,531,505 | 3/1925 | Roberts _____ 156—228 |
| 1,574,113 | 2/1926 | Roberts. |
| 3,250,660 | 5/1966 | Greig et al. _____ 156—499 X |
| 3,411,974 | 11/1968 | Jones-Hinton et al. ___ 156—228 |
| 3,412,183 | 11/1968 | Anderson et al. |
| 3,444,034 | 5/1969 | Hewett. |

REUBEN EPSTEIN, Primary Examiner

U.S. Cl. X.R.

156—581, 583, 228, 242; 18—19